Aug. 11, 1964  J. B. CLELLAND  3,144,424
ASPHALT COATING COMPOSITION CONTAINING ASPHALTENES
AND ATACTIC POLYPROPYLENE
Filed Nov. 3, 1960
A-% Asphalt
B-% Atactic Polypropylene
C-% Asphaltenes
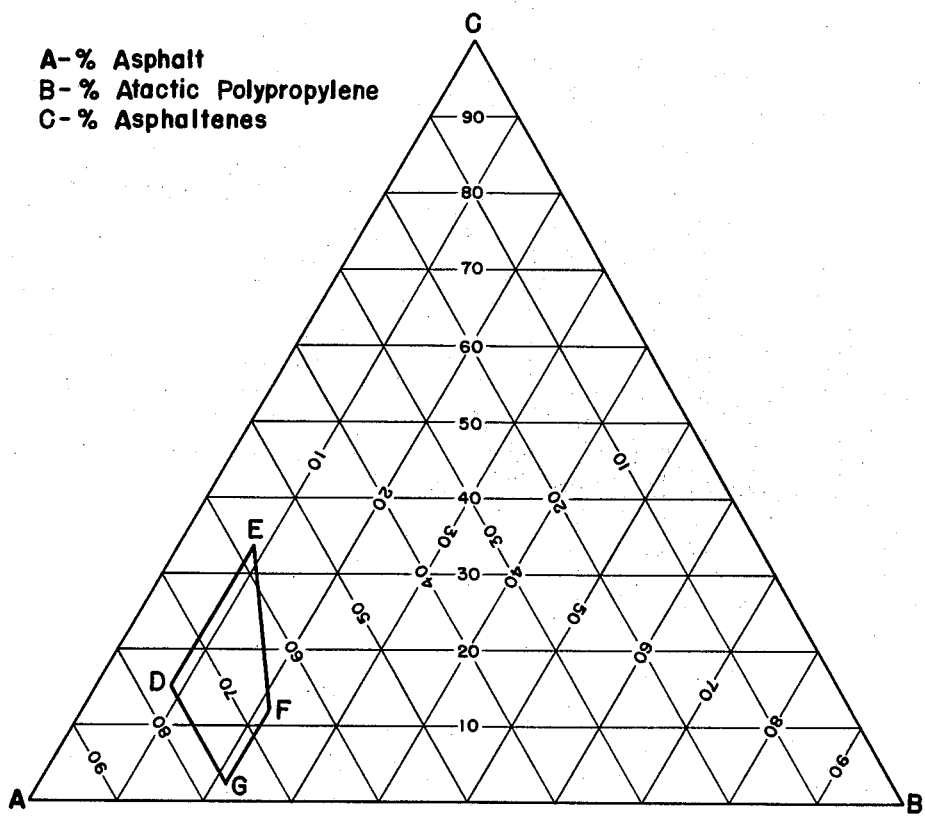
INVENTOR.
JAMES B. CLELLAND
BY
ATTORNEY 3,144,424
ASPHALT COATING COMPOSITION CONTAINING ASPHALTENES AND ATACTIC POLYPROPYLENE
James B. Clelland, Newtown Square, Pa., assignor to Sun Oil Company, Philadelphia, Pa., a corporation of New Jersey
Filed Nov. 3, 1960, Ser. No. 67,114
3 Claims. (Cl. 260—28.5)

This invention relates to improved asphalt coating compositions and, in particular, to coatings to be used in the roofing art.

There are two general categories of asphalt roofing— "prepared" roofing and "built-up" roofing. Prepared roofings are factory manufactured in the form of shingles and rolls. They consist of a felt paper saturated with a thin asphalt and coated with a heavier asphalt and are usually topped with a coating of mineral granules. Built-up roofing is fabricated on the job from felt paper, asphalt and mineral cover. These roofs are subjected to hot sun and freezing cold as well as to wind and rain.

The composition of the present invention is particularly adapted to the coating of asphalt shingles which are used on sloped roofs. In summer, the asphalt must cling to the shingle base without creep and in winter the asphalt must flex when the cold shingle is bent by the lifting action of the wind.

Accordingly, it is the object of the present invention to provide an asphalt coating composition which is outstanding in its resistance to the effects of hot and cold weather and to flexing.

I have discovered an asphalt coating composition comprising asphalt, atactic polypropylene and added asphaltenes which possesses properties superior to those of ordinary roofing asphalt, particularly in improved cold flexibility and creep resistance.

FIGURE 1 is a triangular coordinate graph. It is an equilateral triangle ABC, divided by three series of parallel lines, each series being parallel to one side of the triangle. The distance between an apex of the triangle and the side opposite that apex represents variations in percentages of the component designated by that apex varying from 100% to 0% in equal increments running from the apex to the opposite side of the triangle. Thus, any point within the triangle represents a single three-component composition, the indicated percentages of the three components totaling 100%.

The invention is particularly directed to a three component composition comprising asphalt, atactic polypropylene and asphaltenes wherein the proportions of the three components are chosen from the approximate area bounded by the tetrahedron DEFG. If the proportions of the three components are chosen from the area DEFG, the resulting composition will have good creep resistance and/or good flexing qualities.

The asphalt component of the present invention is the residuum recovered from vacuum distillation of asphalt base crude oils and may have been further treated by steam refining, solvent extraction or by air blowing. I have found that many asphalts which cannot be brought to roofing specifications by the above treatments can be upgraded by the addition of proper amounts of atactic polypropylene and asphaltenes.

At the present time, no satisfactory commercial use has been found for atactic (essentially non-crystalline) polypropylene formed during the stereospecific polymerization of propylene. The polymerization takes place in the presence of a catalyst comprising a coordination complex of a transition metal halide with an organometallic compound. The atactic polypropylene usually represents from about 5 to about 15% by weight of the polymerization product, the remainder being crystalline or isotactic polypropylene. The solid atactic polymer has a molecular weight of from about 10,000 to about 40,000, more particularly, from about 17,000 to about 25,000. It is soluble in boiling pentane, hexane, heptane and other hydrocarbons.

In one known process, the polymerization product in the heptane reaction medium is contacted with a solvent consisting of methanol and water to kill the catalyst. The catalyst is then removed in solution leaving a heptane slurry. The atactic polypropylene is in solution in the heptane and this solution is removed from the isotactic polymer. The solution is distilled to recover the heptane solvent which is recycled. The solid material which remains is the atactic polypropylene employed in the composition of this invention.

The amount of atactic polypropylene employed varies from about 10 to about 25 percent by weight based on the total composition. The preferred range is from 15 to 20 percent by weight.

Any suitable mixing method can be used which results in good distribution of the polymer in the asphalt.

Asphalt is a colloidal system having a disperse phase and a continuous phase. The components of highest molecular weight (i.e., the micelles) constitute the disperse phase and are known to the art as asphaltenes. The continuous, or intermicellar phase represents the components of lower molecular weight, and these are known as maltenes. The asphaltenes are insoluble in low-boiling saturated hydrocarbons but are soluble in carbon tetrachloride and these solubility characteristics are the basis of the separation of asphaltenes as a distinct phase. They form an extremely hard and brittle solid which has a penetration of zero at 77° F. They are preferably ground to a coarse powder for blending in the composition of the present invention.

The composition of the invention contains from about 10 to about 30 weight percent of added asphaltenes; preferably from about 10 to about 15 weight percent added asphaltenes.

The proposed roof coating composition may be used alone or in conjunction with fillers such as fiber glass, asbestos, rock wool and other materials. It may be used with saturated or unsaturated roofing paper, fabric or film.

If desired, the base asphalt may be given chemical treatments or physical treatments prior to the addition of the atactic polypropylene and asphaltenes.

The following examples will serve to illustrate the properties of the compositions of the present invention.

The base asphalt used in the examples is a soft residual bottoms obtained by vacuum distillation of a Venezuelan crude. The asphalt has a softening point of 100° F., a penetration of 168 at 77° F., a Saybolt Furol viscosity of 787 at 210° F. and a flash point of 640° F. This material was air blown in the conventional manner to obtain a shingle coating similar to those in use at present.

The air blown asphalt was subjected to the following creep test: A sample was heated to about 170° F. and poured into a brass break-away mold. After cooling, the mold was removed leaving a cylindrical sample about 1.0 inch long and having a diameter of 7/16 inch. The cylinder was placed at the top of a grooved brass plate by pressing into one of the grooves. The brass plate was set at an angle of 45°. The assembly was then placed in an oven and maintained at a constant temperature for the desired period of time. The sample partially melted and the melted portion slid down the groove. A relative value was obtained by measuring the number of millimeters of creep in a preselected time at a preselected temperature. The air blown shingle coating had a creep of 2.6 millimeters after 24 hours at 125° F. After 24 hours at 150° F., the creep value was 10 mm. and after 64 hours at 150° F., the creep was 23.6 mm.

The flex value of the air blown asphalt was obtained by making a standard test bar of the asphalt measuring ¼ inch x 1.0 inch x 4.0 inches in a brass frame. The frame was removed and the sample cooled to a temperature somewhat above the expected break point. The sample was then bent over an 11/32 inch glass rod. Steady pressure was maintained on the sample to accomplish a 180° bend in 10 seconds. A number of samples were tested at increasingly lower temperatures. The air blown shingle coating broke after a 2° flex at 22° F. and after a 5° flex at 27° F.

The effect of the addition of atactic polypropylene and asphaltenes to untreated soft residual asphalt is shown in Table I below. Tests were conducted in the same manner and with the same equipment used for the air blown asphalt.

from about 10 to about 25 percent by weight atactic polypropylene obtained from the stereo-specific polymerization of proxylene.

2. A composition adapted to the fabrication of prepared roofing comprising from about 55 to about 75 percent by weight asphalt, from about 10 to about 30 percent by weight of added asphaltenes and from about 10 to about 25 percent by weight atactic polypropylene having a molecular weight from about 10,000 to about 40,000.

3. A coating composition comprising from about 65 to about 75 percent by weight asphalt, from about 10 to about 15 percent of added asphaltenes and from about 15 to about 20 percent by weight solid atactic polypropylene having a molecular weight of from about 17,000 to about 25,000.

*Table I*

| | Composition | | | Property | | | | | | | | |
|---|---|---|---|---|---|---|---|---|---|---|---|---|
| | Asphalt, percent | Atactic Polypropylene, percent | Asphaltenes, percent | Creep—mm. | | | | Flex—Degrees of Arc | | | | |
| | | | | 24 hrs., 125° F. | 64 hrs., 125° F. | 24 hrs., 150° F. | 64 hrs., 150° F. | 4° F. | 10° F. | 17° F. | 22° F. | 27° F. |
| 1 | Air Blown Asphalt | | | 2.6 | | 10 | 23.6 | | | | 2 | 5 |
| 2 | 90 | 10 | | 180 | | | | 5 | 90 | 180 | | |
| 3 | 80 | 20 | | | | 75 | | 180 | | | | |
| 4 | 84.3 | 10 | 5.7 | Flowed at Room Temperature | | | | | 5 | | | |
| 5 | 72.0 | 10 | 18.0 | 12 | 16 | | | | 5 | | | |
| 6 | 67.5 | 10 | 22.5 | | | 6.6 | 15 | | 5 | | | |
| 7 | 60 | 10 | 30.0 | 0.6 | 1.6 | 3.4 | | | 5 | | | |
| 8 | 74.9 | 20 | 5.1 | | | | 6 | 180 | | | | |
| 9 | 68.6 | 20 | 11.4 | | | | 4.3 | 180 | | | | |

It can be seen from the table that various combinations of atactic polypropylene and asphaltenes can be made with the base asphalt to obtain superior creep resistance, superior flex or a combination of both. By varying composition, it is thus possible to obtain a shingle coating which will give good performance in any climate and also in areas where seasonal conditions vary. Examples 5–7 show compositions which are well suited to areas of consistently warm climate. Examples 8 and 9 show compositions which will give good performance in areas where the climate changes radically during the year.

I claim:

1. A coating composition comprising from about 55 to about 75 percent by weight asphalt, from about 10 to about 30 percent by weight of added asphaltenes and

References Cited in the file of this patent

UNITED STATES PATENTS

| | | |
|---|---|---|
| 2,252,111 | Batchelder | Aug. 12, 1941 |
| 2,475,699 | Derksen | July 12, 1949 |
| 2,752,264 | Pickell | June 26, 1956 |
| 2,871,212 | Thayer | Jan. 27, 1959 |
| 2,909,441 | Pickell | Oct. 20, 1959 |
| 2,909,498 | Sayko | Oct. 20, 1959 |
| 2,940,920 | Garvin et al. | June 14, 1960 |
| 3,036,900 | Honeycutt | May 29, 1962 |

OTHER REFERENCES

Barth: "Tailor Made Asphalts," Petroleum Engineer, vol. 30, No. 3, C22–25, March 1958.

Ellis: "Chemistry of Petroleum Derivatives," vol. II, p. 1201, Reinhold Pub. Co., 1937.